Inventor
RALPH T. SQUIER

George H. Fisher
Attorney

Jan. 13, 1953 R. T. SQUIER 2,625,046
LOW DIFFERENTIAL SWITCHING APPARATUS
Filed Dec. 18, 1950 2 SHEETS—SHEET 2
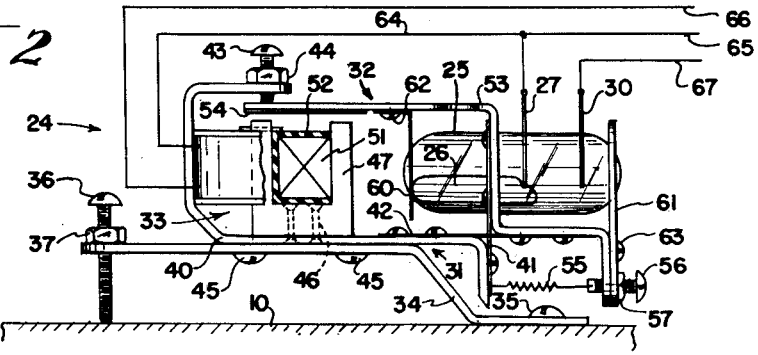
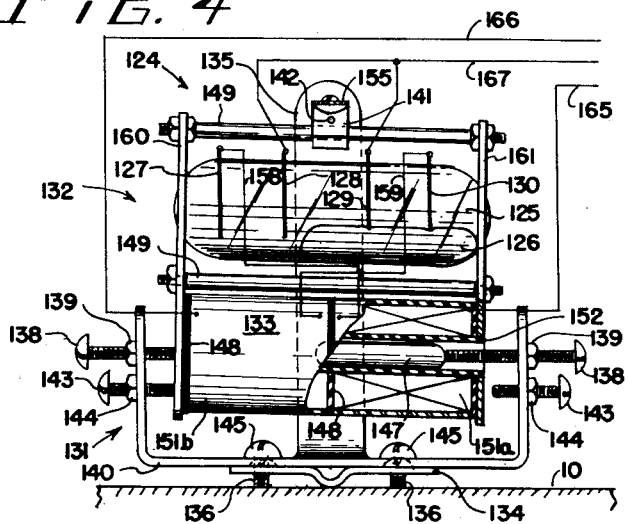
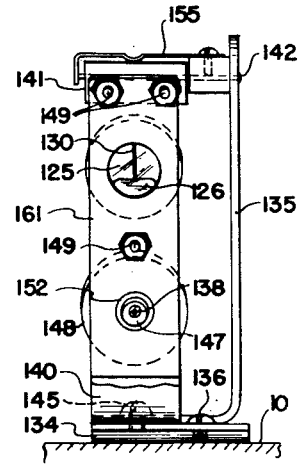
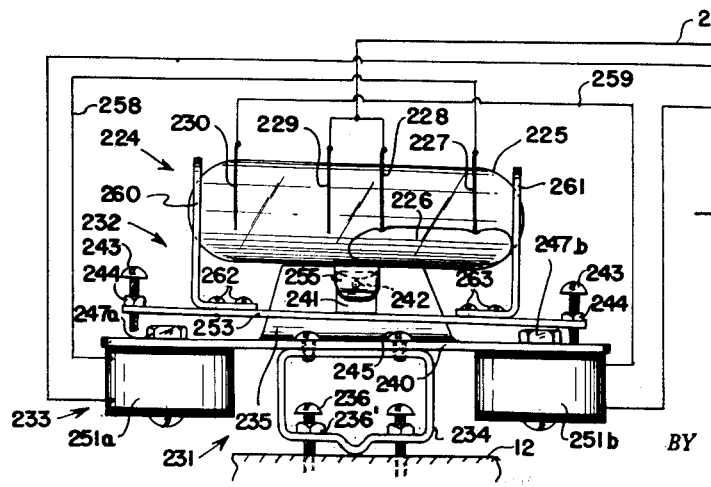
INVENTOR.
RALPH T. SQUIER
BY
George H Fisher
ATTORNEY Patented Jan. 13, 1953

2,625,046

UNITED STATES PATENT OFFICE 2,625,046

LOW DIFFERENTIAL SWITCHING APPARATUS

Ralph T. Squier, Minneapolis, Minn., assignor to Minneapolis-Honeywell Regulator Company, Minneapolis, Minn., a corporation of Delaware Application December 18, 1950, Serial No. 201,385

19 Claims. (Cl. 74—5.47)

This invention relates to the field of electrical instrumentation and control, and embodies improvements in fluid switch mountings, fluid switch control systems, and systems for regulating the precession of gyroscopes.

This application is a continuation in part in my copending application Serial No. 777,179 filed October 1, 1947 on "Low Differential Switching Apparatus."

Fluid switches themselves are well known, and the use of such switches to control the operation of torque motors for precessing gyroscopic instruments to maintain a desired attitude is also known. However, gyroscopic precession systems in which the control of the fluid switch rests solely in the position of the gyroscope are subject to certain disabilities such as lack of uniformity of operation, tendency to hunt, insufficient sensitivity, non-interchangeability of fluid switch units, etc., which disabilities it is the purpose of this invention to overcome or minimize.

An object of the invention is to provide an improved system for controlling the precession of gyroscopes. Other objects are to improve the sensitivity of fluid switches by decreasing the differential angle, to provide fluid switch mountings whereby control functions of the switch may in effect be partially anticipated, and to provide electromagnetically actuated means for causing limited movement between a fluid switch and the movable body supporting it.

A further object of this invention is to provide a system for precessing a gyroscope in which a liquid contact type circuit controller is continuously oscillated and subjected to tilt of the gyroscope from a normal position to control precession of the gyroscope in proportion to the amount of tilt thereof.

Various other objects, advantages, and features of novelty which characterize the invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which there are illustrated and described certain preferred embodiments of the invention. In the drawing:

Figure 2 is a view in elevation showing details of a fluid switch suitable for use in the system of Figure 1;

Figures 4 and 5 are elevational views showing details of one fluid switch suitable for use in the system of Figure 3; and Figure 6 is a view in elevation showing details of another fluid switch suitable for use in the system of Figure 3.

Figure 1:
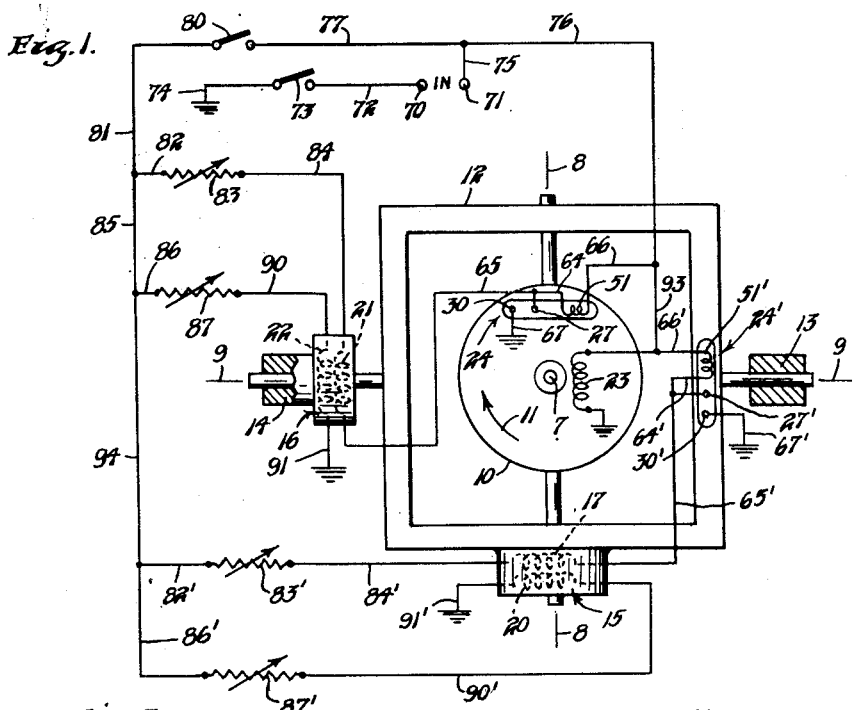
Figure 1 is a generalized view of a gyroscope erecting system according to my invention, the gyroscope being shown in plan.

Figure 1 shows a housing 10 in which a gyroscopic rotor, not shown, is arranged for rotation in a direction indicated by the arrow 11 about a vertical axis 7. The rotor contained in housing 10 is maintained in rotation at high speed, and there is indicated at 23 suitable electric motor structure for performing this function.

Housing 10 is mounted for pivotal movement, with respect to a Cardan ring 12, about a first normally horizontal axis 8, and Cardan ring 12 in turn is mounted for pivotal movement, with respect to a pair of support members 13 and 14, about a second normal horizontal axis 9, at right angles to the first.

A reversible torque motor 15 is provided for applying torque between housing 10 and Cardan ring 12, and a second torque motor 16 is provided for causing torque between Cardan ring 12 and support member 14. Torque motor 15 is shown to comprise a first component 17, effective when energized to cause application of torque in a first direction, and a second component 20, effective when energized to cause application of torque in the opposite direction. Similarly, torque motor 16 is shown to comprise a first component 21, effective to apply torque in a first direction, and a second component 22 effective to apply torque in the opposite direction.

The structure thus far disclosed is conventional and the showing is therefore schematic.

Mounted on housing 10 there is shown in Figure 1 a mercury switch 24, of which the constructional details are shown in Figure 2. The switch comprises a glass envelope 25 containing a globule of mercury 26. A pair of electrodes 27 and 30 pass through the envelope, and the dimensions of the envelope, the amount of mercury, and the position and length of the electrodes are so chosen that when the switch is tilted clockwise (as viewed in Figure 2), the mercury completes an electrical path between the electrodes, while when the switch is tilted in the opposite direction the electrical path is interrupted.

The mercury switch also includes a mounting of which the principal components are a support 31, an armature 32, and an electromagnetic member 33. The support 31 includes a formed resilient base member 34, one end of which is fastened by machine screws 35 to housing 10, and the other end of which is adjustably spaced from housing 10 by a machine screw 36 threadedly engaging the resilient member, to which it is locked in any desired adjusted position by a lock nut 37. Support 31 includes a plate member 40 shaped to perform a number of supporting functions. At one end, plate member 40 is shaped to anchor the ends of a set of crossed reeds 41, 42 which act as a bearing for armature 32. At the other end plate member 40 is reversely bent so as to cooperate with armature 32 to act as a stop for movement thereof. In order that this stopping function may be adjustable, a machine screw 43 threadedly engages this end of member 40, and is locked in any desired position by a lock nut 44. Plate member 40 is fastened to member 34 by machine screws 45, and is arranged intermediate its ends to support electromagnetic member 33, which is attached to it by screws 46.

Electromagnetic member 33 is shown to comprise a U-shaped core 47 of ferromagnetic material on one leg of which there is pressed or otherwise suitably mounted a form or spool 52 carrying a winding 51.

Armature 32 is shown to comprise a frame member 53 of non-magnetic material formed intermediate its end to receive the ends of reeds 41 and 42 not fastened to support 31. Near one end, frame member 53 is provided with a strip 54 of ferromagnetic material suitably mounted for cooperation with electromagnetic member 33 to cause movement of armature 32 away from stop 43 when winding 51 is energized. This motion of the armature is opposed by a spring 55 connected between plate member 40 and armature 32, and adjustably tensioned by a screw 56 whose position can be locked by a nut 57. When winding 51 is unenergized, spring 55 maintains armature 32 in contact with stop 43.

The glass envelope is mounted on armature 32 by a pair of bracket members 60 and 61, fastened to frame member 53 by screws 62 and 63. When winding 51 is energized, armature 32 pivots upon its reed bearings in a counter-clockwise direction until it engages core 47, and this tilts envelope 25 so that the mercury moves to the left in the envelope to assume a position in which the electrical connection between electrodes 27 and 30 is broken. When winding 51 is deenergized, spring 55 causes the armature to pivot in a clockwise direction until it engages stop means 43, and this tilts envelope 25 so that the mercury moves to the right to assume a position in which the electrical connection between electrodes 27 and 30 is completed.

Limited movement of envelope 25 relative to the housing 10 on which the switch is mounted is thus permitted by pivotal movement of armature 32 on its crossed reeds 41, 42: this movement is limited at one extremity by contact of strip 54 with core 47, and at the other extremity by contact of armature 32 with screw 43. This movement is, of course, in addition to any tilting movement of housing 10 which may take place.

As shown in Figure 2, one terminal of winding 51 is connected with electrode 27 by an electrical conductor 64, and another electrical conductor 65 is also connected thereto. A further electrical conductor 66 is connected to the other terminal of solenoid winding 51 and yet another electrical conductor 67 is connected to the other electrode 30. These conductors have been identified by the same reference numerals in Figure 1, to which reference should now be made for explanation of the complete circuit.

Electrical energy from an A. C. source is supplied to this system at a pair of terminals 70 and 71, the former of which is grounded through conductor 72, switch 73, and ground connection 74. A circuit may be traced from the ungrounded terminal 71 through conductors 75 and 77, a switch 80, conductors 81 and 82, a variable resistor 83, conductor 84, winding 21 of torque motor 16, and conductor 65, to electrode 27. Electrode 30 is grounded, thus completing a circuit from the source through torque motor 16 whenever the envelope is tilted in a clockwise direction as seen in Figure 2.

A circuit may be also traced from the ungrounded terminal 71 of the source through conductors 75 and 77, switch 80, conductors 81, 85 and 86, variable resistor 87, conductor 90, winding 22 of torque motor 16, ground connections 91 and 74, switch 73, and conductor 72 back to terminal 70 of the source. It will be seen by inspection of the circuits just traced that winding 22 of torque motor 16 is continuously energized from the source, while winding 21 of the torque motor is energized only when the mercury makes connection between electrodes 27 and 30. The force exerted by component 21 when energized is designed to be twice as great as that exerted by component 22, so that when both components are energized, the effective torque output of the motor is equal in magnitude and opposite in direction to that when only one component 22 is energized.

Whenever the mercury completes the electrical connection between electrodes 27 and 30, a further circuit may be traced from terminal 71 of the source through conductors 75, 76, and 66, winding 51, conductor 64, electrode 27, mercury 26, electrode 30, ground connections 67 and 74, switch 73 and conductor 72 to terminal 70 of the source. The purpose of this further circuit will now be explained.

It is a well known characteristic of fluid switches such as switch 24 that a definite and sometimes considerable angle of tilt must be passed through between the position of the envelope in which the mercury completes the connection between electrodes 27 and 30 and that in which the mercury breaks that connection. This angle will be referred to as the differential angle of the switch, and depends on the size and shape of the envelope, the amount of mercury, the length and position of the electrodes, and other factors. For ideal performance of control functions with precise controlling devices the differential angle of the switch would of course be minimum. This is never achieved in practice, and even a close approach to a negligibly small differential angle greatly increases the cost of manufacturing these tubes on a production basis, both by increasing the manufacturing skills required to produce such units, and by narrowing the tolerances to a point where too many of the units manufactured must be rejected. Mercury switch 24, as disclosed in the present application, however, is designed to obtain the effect of a very small differential angle from a fluid switch whose actual differential may be many times that desired.

When mercury switch 24 is in the condition shown in Figure 2, only component 22 of torque motor 26 is energized, and this component is acting to cause rotation of housing 10 in Cardan ring 12 in such a direction as to raise the left end portion of the housing as shown in Figure 2 and to lower the right hand portion. The position of support member 31 is so adjusted by operating screw 36 that just as housing 10 passes clockwise through a level condition mercury globule 26 moves to the right, causing energization of component 21 of torque motor 16 also. In the ordinary switch the joint operation of components 21 and 22 of torque motor 16 would then continue until housing 10 had moved back through an angle equal to the differential angle of the switch, when the circuit through the switch would again be interrupted. In the present structure, however, completion of the circuit by the mercury not only energizes the second component of the torque motor, but also energizes electromagnetic member 33, drawing the armature 32 down into contact with member 47, and so tilting envelope 25 in the same direction as that in which the torque is now effective. Member 43 is adjusted so that the movement of armature 32 under the influence of electromagnetic member 33 is almost but not quite equal to the differential angle of the switch so that as soon as the mercury has completed the circuit between the electrodes, the envelope assumes a new position independent of movement of housing 10, in which only a slight additional tilt of the mercury switch due to correction of the position of housing 10 is required to open the circuit through the mercury, thus reversing the direction of operation of the torque motor, and at the same time releasing armature 32 so that a change in the position of envelope 25 with respect to housing 10 almost equal to the differential angle of the switch but in the opposite direction again takes place. It will be apparent that by suitable adjustment of screws 36 and 43, it is possible to obtain almost any effective differential angle not greater than the actual angle of switch 24.

Five means for adjusting the system are provided. In the first place, the force exerted by spring 55 relative to that exerted by electromagnet member 33 is adjustable by screw 56. In the second place, the rate of erection of the gyroscope due to component 22 only of torque motor 16 is adjustable by means of variable resistor 87. In the third place, a rate of erection of the gyroscope in the opposite direction is adjustable by the setting of variable resistor 83. In the fourth place the stabilized condition brought about by operation of the mercury switch can be adjusted by screw 36 so that the average position of housing 10 is horizontal. In the fifth place, the effective differential angle of the switch may be adjusted by operation of screw 43.

For the sake of completeness a second fluid switch 24' is shown as mounted on Cardan ring 12 for response to movement of the gyroscope out of the horizontal position about the other horizontal axis. Both the structure of this switch and its circuit connection are in every way analogous to those described in connection with mercury switch 24. Thus winding 20 of torque motor 15 is continuously energized through conductors 94 and 86', variable resistor 87', conductor 90' and ground connection 91'. Winding 17 of torque motor 15 is energized upon operation of switch 24' through conductors 94 and 82', variable resistor 83', conductors 84' and 65' and ground connection 67'. Winding 51' of switch 24' is energized upon operation of the switch through conductors 93 and 66' and conductor 64' and ground connection 67'.

An identifying feature of the modification of the invention thus far described is to be found in the fact that at least one of the torque motors is at all times energized, even when the gyroscope is in the desired attitude. The arrangement is also not efficient in that whenever both the components of any torque motor are energized at once, two-thirds of energy supplied is wasted in the opposition between these two components. The structure on the other hand has the advantage that the gyroscope is in continual slight motion about both its precession axes, and therefore static friction is reduced to a minimum.

There is shown in Figures 3, 4, 5 and 6 a modification of the invention in which torque motor energization takes place only when the gyroscope departs from its desired attitude, and in which no electrical energy is wasted in opposition between opposed, simultaneously operating portions of the system. So far as members are common to Figures 1 and 3, they have been given the same reference numerals. Elements in Figures 4 and 5 related to similar elements in Figure 2 but not exactly the same will be given reference numerals 100 higher than those in Figure 1, and elements having no counterparts in Figures 1 and 2 will be given other numbers in the series from 100 to 200. The same sort of assignment of numbers in the series from 200 to 300 will be made in Figure 6, and the numbers on Figure 3 will be found to agree.

Figure 3:
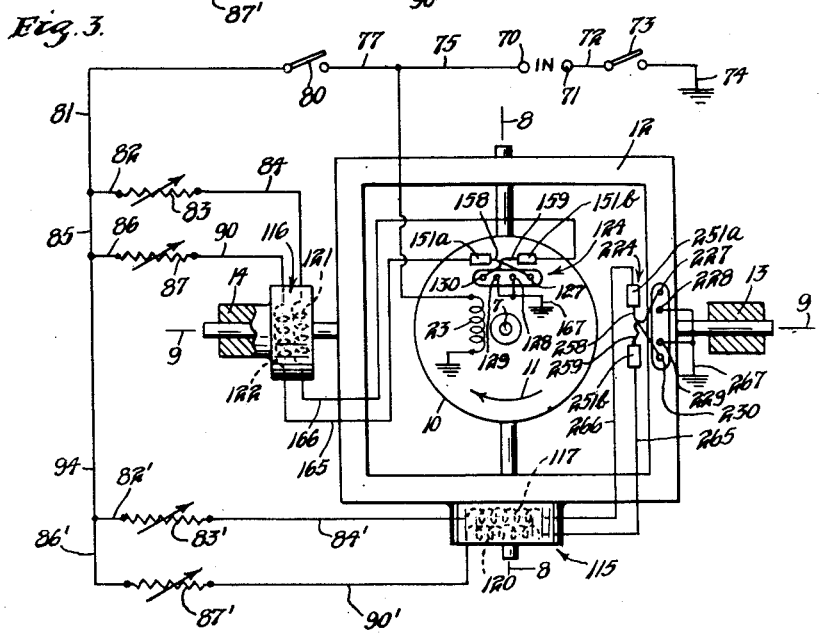
Figure 3 is a view similar to Figure 1, showing a modification of the system.

Figure 3 shows a casing 10 in which a gyroscopic rotor is mounted for rotation by an electrical motor 23, in the direction indicated by arrow 11 about a normally vertical axis 7. Casing 10 is mounted for rotation about the axis 8 with respect to the Cardan ring 12, which in turn is mounted for rotation about the axis 9 with respect to the support members 13 and 14. A torque motor 115 is provided for applying torque between the housing and the Cardan ring, and a second torque motor 116 is provided for applying torque between the Cardan ring and the support member 14. Torque motor 115 comprises two components 117 and 120, and torque motor 116 comprises two components 121 and 122. A first fluid switch 124 is mounted on the housing 10 for responding to tilt of the housing about axis 8 and a second fluid switch 224 is mounted on Cardan ring 12 for tilting about axis 9.

Torque motors 115, 116 are of identical construction. When component 121 of torque motor 116 is energized, for example, torque is applied between the Cardan ring 12 and support member 14 in a first direction, while when component 122 is energized torque is applied between Cardan ring 12 and support member 14 in the opposite direction. In this embodiment of the invention the arrangement is such that only one component of the torque motor is energized at any given time, and when the gyroscope is in its desired position neither component is energized. Before discussing the circuit by which this is accomplished, reference should be made to Figures 4 and 5, which show fluid switch 124 in detail.

Fluid switch 124 comprises a support 131 and an armature 132 including an electromagnetic member 133 and an envelope 125. Support 131 includes a base member 134, formed with a central downwardly curved portion and fastened to housing 10 by machine screws 136: loosening either one of these screws and further tightening the other permits tilting of base member 134 about its curved portion in either direction with respect to housing 10. Support 131 also includes a plate member 140 which is fastened to member 134 by machine screws 145. Plate member 140 includes an upwardly projecting arm 135 to the top of which there is fixed by any suitable means a pivot pin 142 from which armature 132 is pendulous. Adjustable stop screws 143, including lock nuts 144, are provided at each end of plate member 140 for limiting the movement of armature 132 with respect thereto, as will presently become apparent.

Armature 132 includes a block 141 pivotally supported on pivot pin 142, a pair of end plates 160 and 161, a plurality of tie rods 149, and electromagnetic member 133, which is shown to comprise a pair of solenoids 151a and 151b mounted on an insulating tubular core 152 of magnetically non-reactive material between insulating spacers 148. A core 147 of magnetic material is arranged for sliding movement within tubular member 152 in response to magnetic flux set up by electrical energization of the solenoids. Set screws 138 having lock nuts 139 are provided to limit the movement of member 147 within the coil.

Block 141 is traversed by two of the rods 149, to the centers of which it is connected by pins or other suitable means. End plates 160 and 161 are provided with apertures for receiving tie rods 149, tubular member 152, and the ends of the envelope 125 of fluid switch 124 which includes a globule of mercury 126 and electrodes 127, 128, 129 and 130. Switch 124 is also constructed so that it has no dead spot, that is, the mercury 126 therein flows between the pairs of electrodes 127, 128 and 129, 130 without stopping in an intermediate position. The mercury switch and the electromagnetic member are assembled together to comprise a unitary armature by tightening the nuts on the ends of tie rods 149. The whole assembly is then mounted on pivot 142. A spring clip member 155 is secured to the rear portion of member 142, and has a downwardly extending forward portion which prevents block 141 from sliding off the pivot. Member 155 is of resilient material and is provided with a depressed portion which engages the edges of a curved recess in the upper surface of block 141 so as to give a slight centering action tending to maintain the armature in its normally centered, circuit interrupting position.

The fluid switch has three output conductors 165, 166, 167. Conductor 165 is connected through winding 151a and conductor 158 to electrode 127. Conductor 166 is connected through winding 151b and conductor 159 to electrode 130. Conductor 167 is connected to electrodes 128 and 129.

When fluid switch 124 is installed on housing 10, the housing is first set level, and the switch is so adjusted by the setting of adjusting screws 138 that when mercury globule 126 is at one end of the switch and sliding core 147 is at the opposite end of tubular member 152, armature 132 is in the same position, under the influence of gravity, as it is when mercury globule 126 and sliding core 147 are at the other extremes of their travel. The switch as a whole is adjusted by means of screws 136 so that the housing is tilted as far from the horizontal in one direction when the mercury begins to move in a first direction as it is tilted from the horizontal in the other direction when the mercury begins to move in the opposite direction. From this it follows that if the differential angle of the switch were zero, the slightest departure of the housing from the horizontal in either direction would result in completion of a corresponding electric circuit.

Stop screws 143 are now adjusted so that movement of armature 132 with respect to support member 131 is limited to a total angle slightly less than the differential angle of the switch, as was done with the switch shown in Figure 2. The switch is now in proper adjustment.

Referring again to Figure 3, the circuit by which fluid switch 124 controls the attitude of housing 10 will now be explained. Motor 23 driving the rotor of the gyroscope is energized whenever switch 73 is closed. The erecting mechanism including fluid switch 124 and torque motor 116 is energized whenever switch 80 is closed.

Torque motor 116 differs from torque motor 16 in that the torques exerted by the components 121 and 122 are exactly equal instead of having a 2 to 1 ratio. Adjustment of the forces exerted by the two components of the torque motor is possible by means of the setting of variable resistors 83 and 87.

Now suppose that housing 10 is tilted from its level attitude in such a direction that its left-hand portion as seen in Figure 4 moves downwardly to a considerable extent so that the mercury makes connection between electrodes 127 and 128, switch 80 being closed. An electrical circuit may be traced from terminal 70 through conductors 75 and 77, switch 80, conductors 81, 85 and 86, variable resistor 87, conductor 90, component 122 of torque motor 116, conductor 165, winding 151a, conductor 158, electrode 127, mercury 126, electrode 128, ground conductors 167 and 74, switch 73, and conductor 72. Component 122 of torque motor 116 is accordingly energized to precess housing 10 so that the left-hand portion as seen in Figure 4 is raised, and at the same time winding 151a is energized to slide core 147 to the right as shown in Figure 4, so that its weight shifts the center of gravity of the armature, tilting the latter with respect to the housing through an angle almost equal to the differential angle of the switch, so that only a slight departure of the housing from the horizontal in the opposite direction is necessary to cause opposite energization of the torque motor.

It would be perfectly possible to use a duplicate of switch 124 for response to tilt of the gyroscope housing about the other axis, but there is illustrated in Figure 6 a further modified form of a mercury switch 224 equally well adapted for use in this application. In Figure 6 the envelope 225 of the mercury switch 224 is shown to contain a globule of mercury 226 and electrodes 227, 228, 229 and 230 as before. Switch 224 is similar to switch 124 in that it also has no dead spot. The switch also comprises an armature 232 which is pivotally carried on a support member 231: in this modification of the invention electromagnetic means 233 is carried by the support member rather than by the armature.

Support member 231 is shown to comprise a downwardly curved base member 234 adjustably mounted on Cardan ring 12 in the same manner as was member 134 on housing 10 in Figure 4. Machine screws 236 permit adjusting the tilt of the support member with respect to the Cardan ring, and may be locked in adjusted position by lock nuts 236′. Support member 231 includes a plate member 240 which is fastened to member 234 by machine screws 245, and which carries at its extreme end coils 251a and 251b comprising portions of electromagnetic means 233. Plate member 240 is of non-magnetic material, but the cores 247a and 247b of windings 251a and 251b are a ferromagnetic material. Plate member 240 has an upwardly extending arm 235 from which as before a pivot pin 242 projects. A block 241 is pivotally carried on pivot pin 242, and pivotally supports a strip 253 of ferromagnetic material which constitutes the principal element of armature 232, and which carries at its ends adjustable stop screws 243 complete with lock nuts 244, cooperating with plate member 240 to limit the movement of armature 232 with respect thereto. Bracket means 260 and 261 are fastened to member 253 by machine screws 262, 263 and act as supports for envelope 225.

Electrical connection is made to the switch by means of conductors 265, 266 and 267. Of these conductors, 265 is connected to one terminal of winding 251a, the other terminal of which is connected by conductor 258 to electrode 227 of the mercury switch. In a similar fashion conductor 266 is connected to one terminal of winding 251b, the other terminal of which is connected by conductor 259 to electrode 230 of the mercury switch. Conductor 267 is connected to electrodes 228 and 229 of the mercury switch.

Since in this modification of the invention there is no shifting weight, the adjustment of the switch is made by adjusting screws 236 so that the switch acts about a central position in which Cardan ring 12 is horizontal, in the same fashion that switch 124 was adjusted by means of screws 136. Stops 243 are then adjusted so that the amount of travel of the envelope with respect to the support member is slightly less than the differential angle of the switch.

Referring again to Figure 3, it will be seen that the operation of fluid switch 224 is in every respect the same as that of switch 124. By adjustment of variable resistors 83' and 87' the torques exerted by the components 117 and 120 of torque motor 115 are adjusted to be equal, and thereafter departure of the Cardan ring from a horizontal position is effective to energize the appropriate one of windings 251a and 251b at the same time that it energizes the appropriate component of the torque motor, so that although envelope 225 may comprise a mercury switch with a commercially feasible differential angle, the arrangement acts as though the mercury switch had a very small differential angle.

The embodiments shown in Figures 3–6 may further be modified to give a modulating type of gyroscopic erection by making a change in the relationship of parts while still utilizing the same structure disclosed in these figures. Referring specifically to Figures 4 and 6, the structure therein is modified only by the adjustment of the stops 143 and 243 such that the angular travel or displacement of the switch envelope with respect to the supporting member is greater than the differential angle of the respective switches. With this new arrangement of parts, the operation of the apparatus is substantially changed within a range of displacement of the gyroscope from a normal position which is equal to and less than the angular displacement of the switches 132 and 232. Within these ranges of gyroscope tilt, the switch mechanism 132, 232 will operate in a continuous oscillating manner, that is, the electromagnets of these switches will cause the switch envelopes to be tilted or oscillated between alternate contact making or circuit closure positions at a fixed rate independent of the position of the gyroscope upon which they are mounted. As the gyroscope is tilted or departs from the normal position, however, the switches mounted in the axis of tilt continue their oscillation making and completing the energizing circuits for the windings of the motor 120 and 121 in such a manner that one of the motor windings is energized for a longer period of time than the other winding and the over-all effect of the energization of the respective motors is an effective precession of the gyroscope in a direction to overcome the tilt and erect the gyroscope. This type of energization is in proportion to the departure of the gyroscope from the normal position up to the point where the differential angle of operation of the armature and the electromagnet is exceeded by the tilt of the gyroscope. At this point and all angles beyond this point, the mercury of the respective switch envelopes will remain in contact with the electrodes which are positioned lowest from their normal position and operation of the electromagnet associated therewith will not rotate the switch envelope sufficiently to make the opposite contact. However, the influence of gravity will return the mercury to the former position. The associated erection motor will be energized in a direction to erect the gyroscope.

In a condition of still further tilt of the gyroscope from the normal position, the operation of the electromagnet to rotate the switch envelope will not be such as to cause disengagement of the mercury from the associated electrodes and the erection motor so energized will remain energized continuously until the gyroscope has precessed toward the neutral position up into the range where the oscillating type of switch operation and motor operation takes place.

In this latter embodiment of the invention, it will become apparent that the use of a mercury switch without a dead spot is not required. Further, the gyroscope erection motors because of the oscillatory type of operation of their controlling switches will be in a rate of substantially continuous energization. Since the rate of oscillation of the switches is greater than the rate of response of the erection motors, there will be only minute and insignificant oscillations impressed upon the gyroscope, and the erection system will erect, for all practical purposes, to a true vertical or reference position with variations therefrom which are imperceptible to the systems with which such gyroscopes are associated and to the human eye being exceedingly difficult to measure. This switching apparatus provides a proper timing or modulating type of erection which is extremely sensitive and stable and permits rapid erection upon a wide departure of the gyroscope from the reference position. It also has a definite advantage over known erection systems in that it is continuously energized to maintain the reference position while the prior art methods require a departure of the gyroscope from the reference position before the erection apparatus begins to function.

The various switching apparatus and circuits described herein provide improved means of maintaining the spin axis of a gyroscope vertical or substantially vertical and permit increased sensitivity in operation from relatively insensitive commercial switches. Further a modulating or proportioning action of a particular arrangement of the apparatus may be obtained from the associated erection system.

Numerous objects and advantages of the invention have been set forth in the description, together with details of the structure and function of the various modifications, and the novel features thereof have been clearly disclosed. The disclosure, however, is illustrative only and changes may be made in detail, especially in matters of shape, size and arrangement of parts, within the principle of the invention, to the full extent indicated by the broad general meaning of the terms in which the appended claims are expressed.

I claim as my invention:

1. Means for responding to tilting of a tiltable body comprising, in combination: a fluid switch tiltable through a selected differential angle between opposite circuit controlling conditions; means for tiltably supporting said switch upon such a body, so as to be subject to any tilting movement thereof; electrically energized means for causing limited tilting movement of said switch with respect to said supporting means independent of tilting of said means, through an angle not greater than said selected differential angle; and means connecting said switch to said last named means so that the state of energization thereof is changed upon change in the circuit controlling condition of said switch.

2. A device of the class described comprising, in combination, a support member for mounting upon a tiltable body, an armature pivotally carried on said support member, a fluid switch carried by said armature and having a selected differential angle, electrically energized means carried by said support member for cooperating with said armature to cause pivotal movement thereof with respect to said member, means limiting said pivotal movement to an angle less than said differential angle, and means connecting said fluid switch to said first named means for controlling the operation thereof.

3. A device of the class described comprising, in combination, a support member for mounting upon a tiltable body, an armature pivotally carried on said support member, a fluid switch carried by said armature and having a selected differential angle, means including a pair of coils for electromagnetically causing pivotal movement of said armature, means limiting said pivotal movement to an angle less than said differential angle, and means connecting said fluid switch to said first named means for controlling the operation thereof.

4. A device of the class described comprising, in combination, a support member for mounting upon a tiltable body, an armature pivotally carried by said support member, a fluid switch carried by said armature and having a selected differential angle, means including a pair of coils carried by said armature for electromagnetically causing pivotal movement of said armature with respect to said support member, means limiting said pivotal movement to an angle less than said differential angle, and means connecting said fluid switch to said first named means for controlling the operation thereof.

5. A device of the class described comprising, in combination, a support member for mounting upon a tiltable body, an armature pivotally carried on said support member, a fluid switch carried by said armature and having a selected differential angle, electromagnetic means including a pair of coils carried by said support member for cooperating with said armature to cause pivotal movement thereof, and means limiting said pivotal movement to an angle less than said differential angle, and means connecting said fluid switch to said electromagnetic means for controlling the operation thereof.

6. A device of the class described comprising, in combination, a support member for mounting upon a tiltable body, an armature, a fluid switch carried by said armature and having a selected differential angle, means pivotally mounting said armature upon said support member and urging said armature into a first position, and electrically energized means carried by said support member for cooperating with said armature to cause pivotal movement thereof from said first position, and means connecting said fluid switch to said electrically energized means for controlling the operation thereof.

7. A device of the class described comprising, in combination, a support member for mounting upon a tiltable body, an armature, a fluid switch carried by said armature and having a selected differential angle, means pivotally mounting said armature upon said support member and urging said armature into a first position, electrically energized means carried by said support member for cooperating with said armature to cause pivotal movement thereof from said first position, and means including said fluid switch for energizing said electrically energized means only when said armature is in said first position.

8. In combination: a member which is to be maintained in a predetermined position; a fluid switch tiltable through a selected differential angle between opposite circuit controlling positions; means tiltably supporting said switch upon said member so as to be subject to tilting movement thereof away from said predetermined position; means controlled upon tilt of said switch into either of said circuit controlling positions to produce an effect upon said member tending to tilt said switch out of said position; and means, energized upon tilt of said switch into either of said circuit controlling positions, for causing independent tilting of said switch with respect to said member through an angle not greater than said selected differential angle.

9. In combination: a member which is to be maintained in a predetermined position; a fluid switch tiltable through a selected differential angle between opposite circuit controlling positions; means tiltably supporting said switch upon said member so as to be subject to tilting movement thereof away from said predetermined position; means controlled upon tilt of said switch into either of said circuit controlling positions to produce an effect upon said member tending to tilt said switch out of said position; and means, energized upon tilt of said switch into either of said circuit controlling positions, for causing independent tilting of said switch with respect to said member through an angle not greater than said selected differential angle, and in a direction tending to move said switch out of said circuit controlling positions.

10. A device of the class described comprising, in combination: a fluid switch; a mounting providing limited movement of said switch about a pivotal axis; a member mounted for oscillation about an axis; means supporting said mounting means for oscillation with said member, so that said axes are substantially parallel; electrically actuable means for causing said limited movement of said switch; and means connecting said switch in controlling relation to said last named means, so that tilt of said switch due to movement of said member in a first direction energizes said electrically actuable means to cause said limited movement of said switch in the opposite direction.

11. A device of the class described comprising, in combination: a gyroscope; means mounting said gyroscope for oscillation about a normally horizontal axis; a fluid switch; means mounting said switch for limited movement, from a normal position, about a pivotal axis; means supporting said mounting means for oscillation with said gyroscope so that said axes are substantially parallel; erecting means for said gyroscope; electrically actuable means for causing said limited movement of said switch; and means connecting said switch in controlling relation to said erection means and said last named means, so that upon departure of said gyroscope from a normal horizontal position said switch is tilted in a direction to control said erection means and said electrically actuated means for returning said gyroscope to said horizontal position and causing movement of said switch about said pivotal axis in the same direction as that in which said erection means is acting.

12. A device of the class described comprising, in combination, a support member for mounting upon a tiltable body, an armature pivotally carried on said support member in pendulous relation thereto, a fluid switch carried by said armature and having a selected differential angle, a weight movable along said armature to alter the position of the center of gravity thereof so as to gravitationally cause said pivotal movement, electromagnetic means comprised in said armature for moving said weight, means limiting said pivotal movement to an angle less than said differential angle, and means connecting said fluid switch to said electromagnetic means, for controlling the operation thereof.

13. A device of the class described comprising, in combination: a fluid switch tiltable between a first position, in which it establishes a first circuit condition, and a second position, in which it establishes a second circuit condition, said positions being spaced by tilting of said switch through a minimum differential angle; means mounting said switch for tilting movement through an angle less than said differential angle; a member tiltable through an angle greater than said differential angle; means supporting said mounting means upon said member for tilting movement unitary therewith; means causing tilting of said switch in either of two opposite directions in said mounting means; and means connecting said switch in controlling relation to said last named means, so that tilt of said switch due to movement of said member in a first direction energizes said tilting means to cause said limited movement of said switch in the opposite direction.

14. Means for responding to tilting of a tiltable body comprising, in combination: a fluid switch tiltable through a selected differential angle between opposite circuit controlling conditions; means for tiltably supporting said switch upon such a body, so as to be subject to any tilting movement thereof; electrically energized means for causing limited tilting movement of said switch with respect to said supporting means independent of tilting of said means, through an angle greater than said selected differential angle; and means connecting said switch to said last named means so that the state of energization thereof is changed upon change in the circuit controlling condition of said switch.

15. In combination: a member which is to be maintained in a predetermined position; a fluid switch tiltable through a selected differential angle between opposite circuit controlling positions; means tiltably supporting said switch upon said member so as to be subject to tilting movement thereof away from said predetermined position; means controlled upon tilt of said switch into either of said circuit controlling positions to produce an effect upon said member tending to tilt said member toward said predetermined position; and means, energized upon tilt of said switch into either of said circuit controlling positions, for causing independent continuous oscillatory tilting of said switch with respect to said member through an angle greater than said selected differential angle.

16. In combination: a member which is to be maintained in a predetermined position; a fluid switch tiltable through a selected differential angle between opposite circuit controlling positions; means tiltably supporting said switch upon said member so as to be subject to tilting movement thereof away from said predetermined position; means controlled upon tilt of said switch into either of said circuit controlling positions to produce an effect upon said member tending to tilt said switch out of said position; and means, energized upon tilt of said switch into either of said circuit controlling positions, causing continuous oscillatory tilting of said switch with respect to said member through an angle greater than said selected differential angle and independently of the tilting of said member within limits of tilt of said member which is not greater than said selected differential angle of said switch.

17. Means for responding to tilting of a tiltable body comprising, in comination: a fluid switch which is tiltable through a selected differential angle between the opposite circuit controlling conditions; means for tiltably supporting said switch upon said body such as to be subject to any tilting movement thereof; electrically energized means for causing continuous oscillating movement of said switch with respect to said supporting means independent of the tilting of said body; and means connecting said switch to said last named means such that the state of energization thereof is changed upon change in the circuit controlling condition of said switch.

18. A device of the class described, comprising, in combination: a gyroscope; means mounting said gyroscope for tilt about a pair of mutually perpendicular axes; a fluid switch; means mounting said switch for limited movement from a normal position about a pivotal axis; means supporting said mounting means for tilt with said gyroscope such that one of said perpendicular axes and said pivotal axis are substantially parallel; a reversible erecting means for said gyroscope; electrically energized means for causing continuous oscillating movement of said mounting means and said switch through said limited movement independently of the tilting of said body; and means connecting said switch in controlling relation to said erection means and said electrically energized means, so that upon departure of said gyroscope from a normal position said switch is tilted as it is oscillated to energize said erection means more in one direction than in the other to return said gyroscope to said normal position.

19. A device of the class described comprising, in combination: a support member for mounting upon a tiltable body, an armature, a fluid switch carried by said armature and having a selected differential angle, means pivotally mounting said armature upon said support and urging said armature into a first position, electrically energized means carried by said support member and cooperating with said armature, and means connecting said fluid switch to said electrically energized means for controlling the operation thereof, said electrically energized means and said pivotally mounted armature causing continuous oscillatory pivotal movement of said switch toward and away from said first position independent of the tilt of said body.

RALPH T. SQUIER.

REFERENCES CITED

The following references are of record in the file of this patent:

UNITED STATES PATENTS

| Number | Name | Date |
|---|---|---|
| 1,763,806 | Methvin | June 17, 1930 |
| 1,887,318 | Mahoney | Nov. 8, 1932 |
| 2,417,573 | Strother | Mar. 18, 1947 |
| 2,462,541 | Norden | Feb. 22, 1949 |
| 2,499,238 | Wehrlin | Feb. 28, 1950 |